United States Patent
Middlemass et al.

(10) Patent No.: US 7,802,910 B2
(45) Date of Patent: Sep. 28, 2010

(54) LIGHT GUIDE EXPOSURE DEVICE

(75) Inventors: Kirk A. Middlemass, Winchester Center, CT (US); Stephan J. W. Platzer, Longmeadow, MA (US); George H. Lester, Avon, CT (US); Todd J. Hallock, Thomaston, CT (US)

(73) Assignee: Dymax Corporation, Torrington, CT (US)

( * ) Notice: Subject to any disclaimer, the term of this patent is extended or adjusted under 35 U.S.C. 154(b) by 338 days.

(21) Appl. No.: 12/021,467

(22) Filed: Jan. 29, 2008

(65) Prior Publication Data
US 2009/0190349 A1 Jul. 30, 2009

(51) Int. Cl.
*A61C 5/00* (2006.01)
(52) U.S. Cl. .................. 362/573; 362/574; 362/555
(58) Field of Classification Search .......... 362/109, 362/119, 294, 373, 555, 556, 572, 574, 577, 362/580, 800, 804; 257/81, 88, 98–10; 385/90, 385/91; 433/29, 215; 600/78, 182
See application file for complete search history.

(56) References Cited

U.S. PATENT DOCUMENTS

| | | | |
|---|---|---|---|
| 4,337,759 A | 7/1982 | Popovich et al. | 126/684 |
| 4,688,884 A | 8/1987 | Scifres et al. | 385/38 |
| 4,725,128 A * | 2/1988 | Bornzin et al. | 385/91 |
| 4,948,214 A | 8/1990 | Hamblen | 359/654 |
| 5,022,043 A | 6/1991 | Jacobs | 372/95 |
| 5,204,224 A | 4/1993 | Suzuki | 430/315 |
| 5,404,869 A | 4/1995 | Parkyn, Jr. et al. | 126/699 |
| 5,490,048 A | 2/1996 | Brassier et al. | 362/238 |
| 5,634,711 A * | 6/1997 | Kennedy et al. | 362/119 |
| 5,690,417 A | 11/1997 | Polidor et al. | 362/244 |
| 5,757,557 A | 5/1998 | Medvedev et al. | 359/708 |
| 5,897,195 A | 4/1999 | Choate | 362/33 |
| 6,008,264 A | 12/1999 | Ostler et al. | 522/4 |
| 6,102,696 A | 8/2000 | Osterwalder et al. | 433/29 |
| 6,200,134 B1 | 3/2001 | Kovac et al. | 433/29 |
| 6,260,994 B1 | 7/2001 | Matsumoto et al. | 362/574 |
| 6,282,013 B1 | 8/2001 | Ostler et al. | 359/309 |
| 6,331,111 B1 | 12/2001 | Cao | 433/29 |
| 6,384,099 B1 | 5/2002 | Ostler et al. | 522/4 |
| 6,517,218 B2 | 2/2003 | Hochstein | 362/294 |
| 6,547,423 B2 | 4/2003 | Marshall et al. | 362/333 |
| 6,554,463 B2 | 4/2003 | Hooker et al. | 362/555 |
| 6,638,063 B2 | 10/2003 | Otsuka | 433/29 |

(Continued)

FOREIGN PATENT DOCUMENTS

EP 1795926 6/2007

(Continued)

*Primary Examiner*—Hargobind S Sawhney
(74) *Attorney, Agent, or Firm*—Roberts & Roberts, LLP

(57) ABSTRACT

The invention provides a light guide exposure device comprising light emitting diodes arranged in a single array defining an array width and a flexible light guide having a proximal end and a distal end; the proximal end defining a proximal end diameter. The array is positioned in substantial alignment with the light guide proximal end to direct substantially all of the light from the array to the proximal end. There is no optical element between the light emitting diodes and the proximal end which optical element would decrease the intensity of light directed from the light emitting diodes to the proximal end. The array width is substantially equal to the proximal end diameter.

24 Claims, 4 Drawing Sheets

U.S. PATENT DOCUMENTS

| | | | |
|---|---|---|---|
| 6,645,230 B2 | 11/2003 | Whitehurst | 607/88 |
| 6,752,627 B2 * | 6/2004 | Lin | 433/29 |
| 6,880,954 B2 * | 4/2005 | Ollett et al. | 362/245 |
| 6,918,762 B2 * | 7/2005 | Gill et al. | 433/29 |
| 6,954,270 B2 | 10/2005 | Ostler et al. | 356/318 |
| 7,080,900 B2 | 7/2006 | Takabayashi et al. | 347/102 |
| 7,137,696 B2 | 11/2006 | Siegel | 347/102 |
| 7,175,712 B2 | 2/2007 | Siegel | 118/620 |
| 7,194,185 B2 | 3/2007 | Watanabe | 385/146 |
| 7,211,299 B2 | 5/2007 | Siegel | 427/493 |
| 7,218,830 B2 | 5/2007 | Iimura | 385/146 |
| 7,273,369 B2 | 9/2007 | Rosenblood et al. | 438/690 |
| 7,283,230 B2 | 10/2007 | Ostler et al. | 356/317 |
| 7,409,129 B2 | 8/2008 | Jung et al. | 385/115 |
| 2001/0046652 A1 | 11/2001 | Ostler et al. | 433/29 |
| 2002/0064043 A1 | 5/2002 | Ariga et al. | 362/235 |
| 2004/0165643 A1 | 8/2004 | Lutz | 372/108 |
| 2006/0195165 A1 * | 8/2006 | Gertner et al. | 607/86 |
| 2007/0090272 A1 | 4/2007 | Wang | 250/205 |
| 2007/0231769 A1 | 10/2007 | Kovac et al. | 433/29 |

FOREIGN PATENT DOCUMENTS

| | | |
|---|---|---|
| JP | 02125671 A * | 5/1990 |
| JP | 02220012 A * | 9/1990 |
| JP | 05264871 A * | 10/1993 |
| JP | 05313045 A * | 11/1993 |
| WO | WO 2007/113599 | 10/2007 |

* cited by examiner

LIGHT GUIDE EXPOSURE DEVICE

BACKGROUND OF THE INVENTION

1. Field of the Invention

The present invention relates to a device and method for curing photosensitive compositions using an exposure device containing a light guide such as an optical fiber. More particularly, the invention pertains to a light guide exposure device for curing photosensitive compositions by ultraviolet (UV)/violet light generated by light emitting diodes and directed to the photosensitive composition by the light guide.

2. Description of the Related Art

Ultraviolet curable photosensitive compositions are used in the manufacture of electronic components, medical equipment, and other industrial products. The photocuring compositions found in such environments are typically cured using mercury-arc lamps to flood the UV sensitive material with UV light. While mercury-arc lamp technology is widely used, such technology has several disadvantages. One disadvantage is the relatively short life span of the mercury bulbs used in the mercury-arc lamps. Furthermore, the mercury-arc bulb degrades nonlinearly during its lifetime. As a result, conventional mercury-arc photocuring systems often require monitoring and adjusting the output power as the bulb degrades. Further, mercury-arc lamps are typically powered-on even during stand-by periods because they require cumbersome warm-up and cool-down cycles. As a result, much of the life of the mercury bulbs may be lost during these stand-by periods. Another disadvantage is the broad spectrum of the light radiated by the mercury-arc lamp. A mercury-arc lamp radiates UV, visible, and infrared (IR) light. Typically, UV band pass filters transmit the portion of the UV spectrum required for curing a particular photosensitive material. Heat-rejecting IR filters are usually employed to prevent heating of the cure surface. Because the IR radiation creates a very hot lamp housing, transmission optics near the lamp housing must be made of temperature resistant, UV-transmissive materials.

A wide variety of means are known to control the illumination of a light exposure apparatus. For example, the illumination from the light source can be controlled by changing the current or voltage of the light source or by changing the effective phase section of the current. U.S. Pat. No. 6,515,430 shows a typical light exposure device including a lamp for shining light through a light delivery device which can be an optical fiber. Between the lamp and the optical fiber are a shutter and a diaphragm which controls the duration and intensity of light sent from the lamp to the optical fiber.

In other illumination control techniques, a neutral or gray wedge, a filter or a similar absorptive device can be placed in the optical path between the light source and the optical fiber. However, varying the illumination density by means of a gray wedge is limited and does not permit unobstructed directing of light, but will always reduce maximum illumination. It is also known in the art that the brightness of the light emitted by optical lamps may be controlled by means of a built-in iris diaphragm. U.S. Pat. Nos. 2,735,929 and 3,222,510 show a standard iris diaphragm. However, an iris diaphragm will change the entrance angle of the light into the optical fiber and the exit angle of the light emanating from the optical fiber.

U.S. Pat. No. 7,273,369 shows an optical fiber light module which includes a hollow housing including at least one heat sink, and two or more light sources such as LED arrays. U.S. Pat. No. 4,948,214 shows a lens array for optical scanning devices including a light guide and microlens device for LED imaging. U.S. Pat. No. 6,260,994 shows an endoscope structure which includes LEDs arranged in a matrix at an end of a cylindrically-shaped housing, a light guide for guiding light from the LEDs forward, and a focusing lens. U.S. Pat. No. 6,645,230 shows a structure including an array of LEDs mounted on or within a housing. U.S. Pat. No. 7,218,830 shows a flat panel light guide containing several light-guide members and at least one point light source, such as an LED or array of LEDs. U.S. Pat. No. 5,204,224 relates to a method which includes exposing a photoresist on a wafer to light from an optical fiber light guide, subjecting the photoresist to a second exposure, and developing the photoresist to remove non-exposed areas. No LED or LED arrays are mentioned in this reference. U.S. Pat. No. 7,134,768 relates to an LED lamp with light guide, for use in vehicle lamps, traffic signal lamps, video games, and other lighting applications. The structure includes a plurality of LEDs whose light is collimated via a light guide, and inwardly reflected via multiple reflective surfaces within a housing. U.S. Pat. No. 7,194,185 relates to electronic devices having a colored light guide protruding through a cover. The light guide is illuminated by two LEDs below the cover. The two LEDs are in contact with a second light guide, below the cover, which is capable of blending the light colors from the two LEDs. U.S. Pat. No. 6,880,954 shows a method and apparatus for curing photosensitive materials using LEDs and an optical concentrator to generate high optical power intensities. This reference uses both collimated light LEDs and an optical element between the LEDs and an optical fiber. It has been determined that a problem with these aperture arrangements is non-uniformity of light intensity.

The introduction of UV/violet light emitting diodes (LEDs) has created new alternatives for curing some UV/violet sensitive materials. LED technology offers several advantages over the traditional mercury-arc technology. Typical LEDs last between 50,000 to 100,000 hours, providing a significant lifespan improvement over mercury-arc technologies. UV/violet LEDs also do not emit significant amounts of IR radiation, so heat-rejecting IR filtration is not required. As an added benefit, the reduced heat generation allows the use of economical UV/violet transmitting polymers for optics.

LED sources can also be turned on and off as required because LEDs do not require the warm-up and cool-down periods common in mercury-arc lamp systems. Some LED curing systems may implement driver circuits to control the current supplied to the LEDs. These circuits typically use a closed-loop system to monitor and control the output power of the LEDs, by controlling the drive current, to provide a stable and reliable UV/violet source. These circuits may also define different curing cycles for different photosensitive materials, such as emitting a specific output power for a specific length of time.

Unfortunately, conventional LED sources and LED systems have relatively low output power compared to traditional mercury-arc lamps. While the lower output power LED photocuring systems have proven to be sufficient for some dental applications, many commercial and industrial UV/violet sensitive materials require higher output powers to quickly cure the materials in a fast production environment.

The present invention provides an improved light guide exposure device having improved uniformity and amount of light intensity. A single light emitting diode array is positioned directly adjacent to a proximal end of a flexible light guide in substantial alignment with the light guide proximal end to direct substantially all of the light from the array to the proximal end. There are no optical elements between the light emitting diodes and the proximal end which would decrease the intensity of light directed from the light emitting diodes to the proximal end.

SUMMARY OF THE INVENTION

The invention provides a light guide exposure device comprising a plurality of light emitting diodes arranged in a single array defining an array width; a flexible light guide having a proximal end and a distal end; said proximal end defining a proximal end diameter; said array being positioned in substantial alignment with the light guide proximal end to direct substantially all of the light from the array to the proximal end, in the absence of any optical element between the light emitting diodes and the proximal end which optical element would decrease the intensity of light directed from the light emitting diodes to the proximal end; the array width being substantially equal to the proximal end diameter.

The invention also provides a method for exposing a light sensitive composition comprising:

i) providing a light guide exposure device comprising a plurality of light emitting diodes arranged in a single array defining an array width; a flexible light guide having a proximal end and a distal end; said proximal end defining a proximal end diameter; said array being positioned in substantial alignment with the proximal end to direct substantially all of the light from the array to the proximal end, in the absence of any optical element between the light emitting diodes and the proximal end which optical element would decrease the intensity of light directed from the light emitting diodes to the proximal end; the array width being substantially equal to the proximal end diameter;

ii) generating light with the light emitting diodes;

iii) directing light from the light emitting diodes to the proximal end; and thereafter iv) directing light from the distal end to the light sensitive composition.

DESCRIPTION OF THE INVENTION

Figure 1:
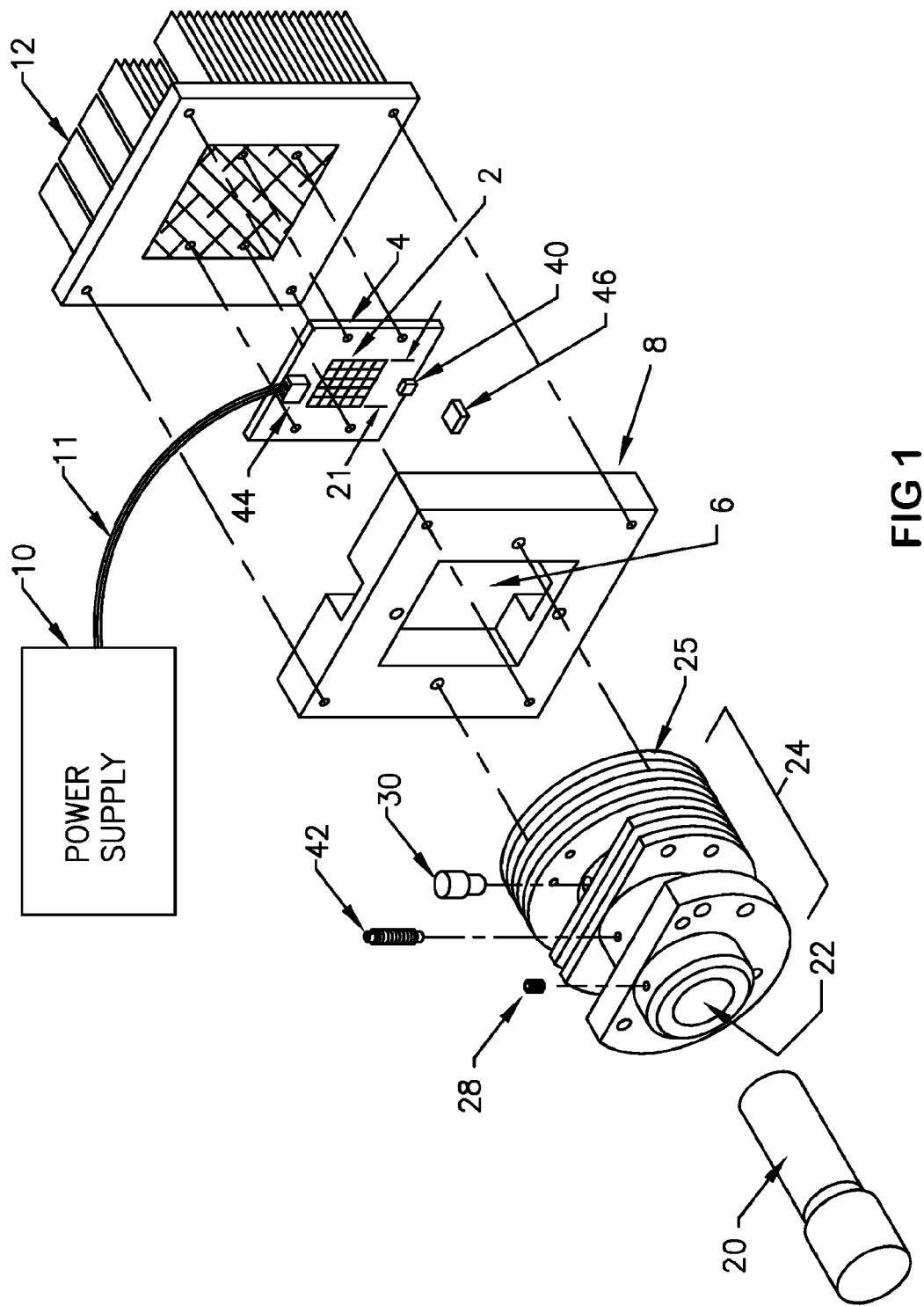
FIG. 1 is an exploded view of a portion of a light guide exposure device according to the invention.
Figure 2:
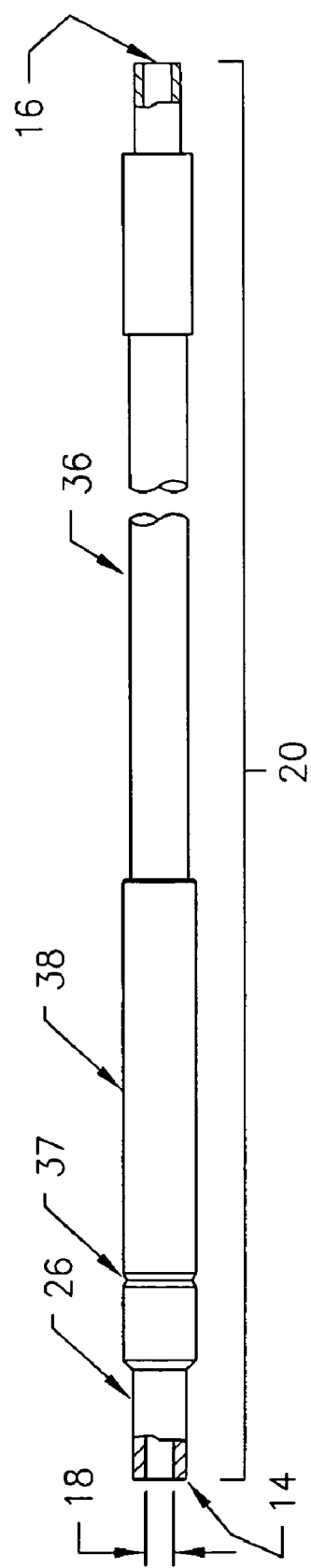
FIG. 2 shows one embodiment of a flexible light guide which forms a part of the invention.

FIGS. 1 and 2 show one embodiment of the invention. FIG. 1 shows an LED array 2 mounted on a metal clad board support 4. Support 4 is preferably mounted within a window area 6 of frame 8 by any convenient fasteners such screws. The LEDs may be powered by a power supply 10 via a power cable 11 to a power connector 44 for the array 2. In one embodiment, the power supply to the LEDs is adjustable, continuously, stepped, or pulsed and provided with a power ramp-up or ramp-down for better controlling the light output for better surface control. This may be a 100 to 240 volt AC, or battery power supply providing approximately 10-100 watts of power at from about 5 to about 24 volts. A battery powered unit would allow the device to be portable.

The power supply may have a timer or on/off switch such as a foot switch, or the like. In one embodiment, the diode array 2 is provided with a heat sink 12 positioned at the back side of the diode array 2 which aids in dissipating any heat generated by the LEDs. The diode array 2 may optionally be provided with a cooling fan with air filter or a liquid cooling circulator, not shown.

The light emitting diodes emit substantially non-collimated light at a maximum peak wavelength in the range of from about 360 nm to about 460 nm, preferably from about 390 nm to about 420 nm. The LEDs may have different maximum wavelengths within this range. The light emitting diodes emit light at a light intensity at their output surface of from about 1 watt/cm$^2$ to about 20 watts/cm$^2$, preferably from about 2 watts/cm$^2$ to about 10 watts/cm$^2$. The LEDs may be driven together, in groups, or individually. In the usual case, the array comprises a matrix of from about 4 to about 625 light emitting diodes in a planar arrangement. This array may have from about 2 to about 25 light emitting diodes in a square arrangement such as from a 2×2 array to a 25×25 array, or any number in between. The array may be square, rectangular, circular, or other geometric arrangement. The array may be planar, concave, or convex.

The array 2 is positioned to provide substantially all of the LED light into a flexible light guide 20, such as that shown as 20 in FIG. 2. The flexible light guide 20 has a proximal end 14 and a distal end 16 which are shown in partial cut-away views in FIG. 2 and FIG. 3. The inside of the proximal end 14 defines a proximal end diameter 18. The array 2 has an array width 21. The array width 21 is substantially equal to the proximal end diameter 18. Within the context of this invention, substantially equal width means that the ratio of proximal end diameter 18 to array width 21 has a ratio of from about 0.4 to about 1.6. The array 2 is positioned in substantial alignment with the light guide proximal end 14 to direct substantially all of the light from the array 2 to the proximal end 14. Preferably the array width 21 and the light guide proximal end diameter 18 are from about 0.4 mm to about 12 mm. In a most preferred embodiment of the invention, there are no optical elements between the light emitting diode array 2 and the proximal end 14 which would decrease the intensity of light directed from the light emitting diodes to the proximal end 14 of the flexible light guide 20. Examples of optical elements which are absent between the light emitting diodes and the proximal end non-exclusively include lenses, condensers, shutter, light absorbing filters, apertures, attenuation wheels, or other optics.

The flexible light guide 20 and the array 2 are connected by a holder 24. Holder 24 has a bore 22 completely through its center for receiving the proximal barrel 26 of the flexible light guide 20. The holder 24 is then fixedly connected to the frame 8 which is connected to the support 4 such that array 2 is in alignment with bore 22 such that light from the LEDs of array 2 pass through the bore 22 and enter the proximal end 14 of flexible light guide 20. Alternatively, the holder 24 may be directly connected to support 4. The holder 24 may optionally be provided with cooling fins 25 to further cool down holder 24 from the radiant heat generated by the LEDs and prevent unwanted heat from entering the proximal end of the light guide 20 when it is within the bore. The heat sink 12 and cooling fins 25 preferably maintain the temperature at the array 2 in the operating range of from about 50° C. to about 100° C. A temperature sensor may be electrically attached to board support 4 at connector 40. Holder 24 may have any convenient configuration which is consistent with an overall housing 80 which contains the component parts of the light guide exposure device. This arrangement allows easy cleaning or replacement of the light guide.

In addition, the light guide exposure device may have a light sensor 46 which is located to capture stray light within the window area 6 of frame 8. The sensor minimally interferes with the light output from the LED array. The electrical signal from this sensor is used to indicate the relative intensity of the light emitted by the LED array. This signal can be used to regulate the power to the LED array to maintain a desired light output.

Figure 3:
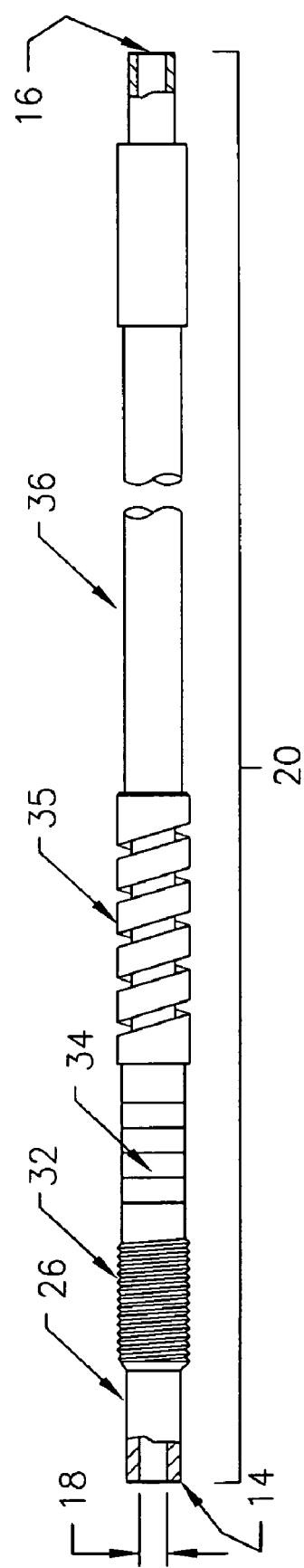
FIG. 3 shows one embodiment of a flexible light guide having a threaded end.

The light guide exposure device further has an arrangement for adjustably controlling the light intensity at the light guide distal end by adjustably fixing a distance between the array 2 and the light guide proximal end 14. The intensity of light transmitted from the LED array 2 and the proximal end 14 of the flexible light guide 20 is controlled by adjusting the distance between the LED array 2 and the proximal end 14 of the flexible light guide 20 within bore 22. As seen in FIG. 2, the flexible light guide 20 has an end member 26 having a length terminating at the proximal end 14. The end member 26 may be smooth and shaped so that the proximal end 14 of the flexible light guide 20 butts against a stop within the holder 24 and does not touch or damage the LED array 2. Proximal support 38 is positioned such as by partially sliding into and being held within bore 22 such that the distance between proximal end 14 and array 2 is adjustably fixed within bore 22. Proximal support 38 leads to a length of flexible tubing 36 of the flexible light guide 20. In one embodiment, proximal support 38 is retained within bore 22 via a set screw 28. In another embodiment as shown in FIG. 3, proximal support 38 may be provided with threads 32 on its outside diameter for mating with mating threads on the inside of bore 22. The length of flexible tubing 36 may be optionally provided with a spring support 35 to prevent the flexible tubing 36 from developing kinks. The light guide exposure device may be provided with a mechanical or electrical means such as an sensor 30 within holder 24, which gauges the separation distance between the array 2 and the light guide proximal end 14. As seen in the embodiment of FIG. 3, adjacent to the threads are lines 34 around the light guide. These lines 34 display the separation distance between proximal end 14 and array 2. As the light guide is screwed out, more lines are revealed outside the holder 24. Light guide 20 may optionally be provided with a notch 37 for cooperating with a spring loaded plunger 42 to assist in securing proximal end 14 within bore 22.

The scale can be in distance (mm) or in corresponding calculated percentage loss of light output. In one embodiment, the array 2 and the light guide proximal end 14 are separated by from about 0.1 mm to about 60 mm. In another embodiment, the array and the light guide proximal end are separated by from about 0.5 mm to about 5 mm. The light guide 20 preferably has a core diameter of from about 0.4 mm to about 12 mm and a length of from about 0.1 meter to about 10 meters. The light output at the distal end 16 usually ranges from about 0.1 watts/cm$^2$ to about 10 watts/cm$^2$, preferably from about 1 watts/cm$^2$ to about 5 watts/cm$^2$. The temperature at the distal end is approximately room temperature. The distal end may be furcated. The distal end may optionally be provided with a focusing lens, a filter such as a neutral density filter, a diffuser, a protector, a polarizer, a disposable window, or the like. The light guide may contain a liquid, a single optical fiber or a bundle of optical fibers. Commercially available optical fibers with as few as 50 fibers per bundle or as many as 62,000 fibers per bundle are suitable.

Figure 4:
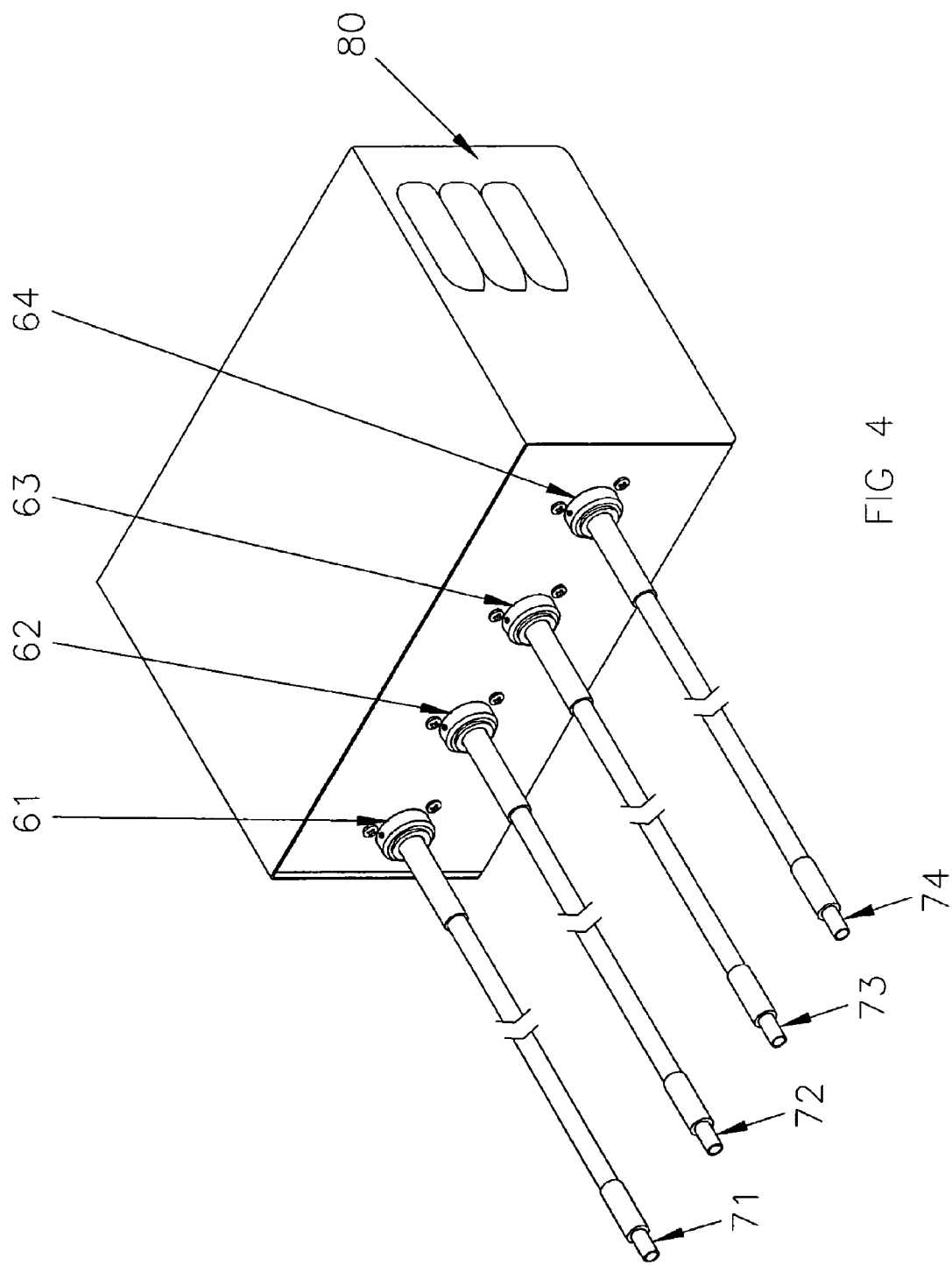
FIG. 4 shows a housing with four light guide exposure devices.

Typically, the light guide exposure device may be mounted on or in an overall housing 80 as seen in FIG. 4 to form a light exposure apparatus, which contains component parts of the light guide exposure device with the distal end outside the housing. The light guide exposure device may optionally be provided with optional components such as input/output communication, safety features, display features, or a light guide simulator. Communication may be, for example via a standard RS232 serial binary data signals connector. Safety features may include indicators, for example a light guide engaged indicator, a housing closed indicator, or a maximum allowed temperature indicator. Display features include a power on/off indicator, an LED lifetime indicator, a proximal light output indicator, a separation distance indicator, an exposure program indicator, or a temperature indicator.

The housing may comprise a plurality of light guide exposure devices, i.e., several LED arrays and light guides. For example, FIG. 4 demonstrates housing 80 with four light guide exposure devices. The distal ends of the holders 61, 62, 63, and 64, which correspond to holder 24 from FIG. 1, can be seen outside the housing. The light guides 71, 72, 73, and 74, which correspond to light guide 20 from FIG. 2, are respectively connected to the holders 61, 62, 63, and 64. The distal ends of the light guides 71, 72, 73, and 74 may be pointed at one object or at different objects. The four LED arrays (not shown) inside the housing 80 are respectively positioned in substantial alignment with the light guide proximal ends, in the absence of any optical element between the light emitting diodes and the proximal end. The arrays may have the same maximum peak wavelength or different ones. The arrays may be turned on and off simultaneously or independently. The light intensity at the distal end of the light guides 71, 72, 73, 74 may be the same or different.

In use, the above described light guide exposure device and a photosensitive composition are provided. UV/violet light is directed onto the photosensitive composition from the LED array 2 and through light guide 20, for a sufficient time, and at a sufficient light intensity to cause a change of a condition of the photosensitive composition. In one embodiment, the photosensitive composition is disposed on a substrate. The photosensitive composition is suitably a light hardenable adhesive composition, coating composition, encapsulant composition, masking composition, or sealant composition, as are well known in the art. The photosensitive composition non-exclusively includes a polymerizable or crosslinkable material comprising an acrylate, a methacrylate, a cyanoacrylate, an epoxy, or combinations thereof. These may be reactive to ultraviolet light or violet light or both. An operator uses the light guide exposure device by placing a photosensitive composition (not shown) in an unhardened form on a selected location or substrate (not shown). The distal end 16 of the flexible light guide 20 is pointed toward the photosensitive composition and the LEDs are activated. The LEDs remain activated for a predetermined amount of time during which time the photosensitive material is exposed to the UV/violet light to cause the photosensitive material to undergo a desired physical change.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A light guide exposure device comprising a plurality of light emitting diodes wherein the light emitting diodes emit substantially non-collimated light at a maximum peak wavelength in the range of from about 360 nm to about 420 nm, arranged in a single array defining an array width; a flexible light guide having a proximal end and a distal end; said proximal end defining a proximal end diameter; said array being positioned in substantial alignment with the light guide proximal end to direct substantially all of the light from the array to the proximal end, in the absence of any optical element between the light emitting diodes and the proximal end which optical element would decrease the intensity of light directed from the light emitting diodes to the proximal end; the array width being substantially equal to the proximal end diameter.

2. The light guide exposure device of claim 1 wherein said light guide proximal end is positioned in substantial alignment with the array by a holder for the light guide proximal end.

3. The light guide exposure device of claim 2 wherein the holder further comprises cooling fins.

4. The light guide exposure device of claim 1 wherein the light emitting diodes emit substantially non-collimated light at a maximum peak wavelength in the range of from about 390 nm to about 420 nm.

5. The light guide exposure device of claim 1 wherein the light emitting diodes emit substantially non-collimated light at a light intensity at the light guide proximal end of from about 1 watt/cm$^2$ to about 20 watts/cm$^2$.

6. The light guide exposure device of claim 1 wherein the light emitting diodes emit substantially non-collimated light at a light intensity at the light guide proximal end of from about 2 watts/cm$^2$ to about 10 watts/cm$^2$.

7. The light guide exposure device of claim 1 wherein the light emitting diodes emit at a light intensity at the light guide proximal end of from about 1 watt/cm$^2$ to about 20 watts/cm$^2$.

8. The light guide exposure device of claim 1 wherein the light intensity at the light guide distal end ranges from about 0.1 watt/cm$^2$ to about 10 watts/cm$^2$.

9. The light guide exposure device of claim 1 wherein the light intensity at the light guide distal end ranges from about 1 watts/cm$^2$ to about 5 watts/cm$^2$.

10. The light guide exposure device of claim 1 wherein the array width and the light guide proximal end diameter are from about 1 mm to about 12 mm.

11. The light guide exposure device of claim 1 wherein the array and the light guide proximal end are separated by from about 0.1 mm to about 60 mm.

12. The light guide exposure device of claim 1 wherein the array and the light guide proximal end are separated by from about 0.5 mm to about 5 mm.

13. The light guide exposure device of claim 1 further comprising an arrangement for adjustably controlling the light intensity at the light guide distal end by adjustably fixing a distance between the array and the light guide proximal end.

14. The light guide exposure device of claim 13 wherein the arrangement comprises a threaded light guide proximal end and a mating threaded holder attached in front of the array.

15. The light guide exposure device of claim 1 further comprising a heat sink in juxtaposition with the array opposite to said light guide proximal end.

16. The light guide exposure device of claim 1 wherein the array comprises a matrix of from about 4 to about 625 light emitting diodes in an arrangement selected from the group consisting of a planar square arrangement or a circular arrangement.

17. The light guide exposure device of claim 1 wherein the light emitting diodes are powered by an adjustable power supply.

18. The light guide exposure device of claim 1 further comprising a light sensor for monitoring the light intensity of the light emitting diodes.

19. The light guide exposure device of claim 1 wherein a plurality of different light emitting diodes are present, wherein each different light emitting diode has a different maximum peak wavelength in the range of from about 360 nm to about 420 nm, such that said light emitting diodes emit substantially non-collimated light at more than one peak wavelength.

20. A light exposure apparatus comprising the light guide exposure device of claim 1 and further comprising a housing containing the array.

21. The light exposure apparatus of claim 20 further comprising one or more additional light guide exposure devices each having its array within the housing.

22. A method for exposing a light sensitive composition comprising:
   i) providing a light guide exposure device comprising a plurality of light emitting diodes wherein the light emitting diodes emit substantially non-collimated light at a maximum peak wavelength in the range of from about 360 nm to about 420 nm, arranged in a single array defining an array width; a flexible light guide having a proximal end and a distal end; said proximal end defining a proximal end diameter; said array being positioned in substantial alignment with the proximal end to direct substantially all of the light from the array to the proximal end, in the absence of any optical element between the light emitting diodes and the proximal end which optical element would decrease the intensity of light directed from the light emitting diodes to the proximal end; the array width being substantially equal to the proximal end diameter;
   ii) generating light with the light emitting diodes;
   iii) directing light from the light emitting diodes to the proximal end; and thereafter
   iv) directing light from the distal end to the light sensitive composition.

23. The method of claim 22 wherein the light sensitive composition comprises a light hardenable adhesive composition, coating composition, encapsulant composition, masking composition, or sealant composition.

24. The method of claim 22 wherein the light sensitive composition comprises a polymerizable or crosslinkable material comprising an acrylate, a methacrylate, a cyanoacrylate, an epoxy, or combinations thereof.

* * * * *